United States Patent [19]

Herman

[11] 3,779,721

[45] Dec. 18, 1973

[54] COMPOSITE METAL HAVING BONDED MEMBERS OF BERYLLIUM

[75] Inventor: Virgil L. Herman, Torrance, Calif.

[73] Assignee: Rockwell International Corporation, El Segundo, Calif.

[22] Filed: Feb. 6, 1970

[21] Appl. No.: 9,238

[52] U.S. Cl.................................. 29/199, 29/197
[51] Int. Cl............................................ B32b 15/00
[58] Field of Search................ 29/196, 196.6, 196.3

[56] References Cited
UNITED STATES PATENTS

| 2,514,873 | 7/1950 | Keene | 29/196.3 |
| 2,713,196 | 7/1955 | Brown | 29/196.3 |
| 2,847,756 | 8/1958 | Sangdahl | 29/194 |
| 3,370,929 | 2/1968 | Mathias | 29/196.3 |
| 3,560,172 | 2/1971 | Kench | 29/196.3 |
| 2,471,663 | 5/1949 | Tietz | 29/196.6 |
| 2,269,523 | 1/1942 | Deutsch | 29/196.6 |
| 2,558,093 | 6/1951 | Kinney | 29/196.3 |
| 2,718,690 | 9/1955 | Ulam | 29/196.3 |
| 2,731,403 | 1/1956 | Rubin | 29/196.6 |

Primary Examiner—Hyland Bizot
Attorney—L. Lee Humphries

[57] ABSTRACT

Two metallic surfaces in substantially uniform area contact with an intervening layer of a brazing alloy are joined by intermolecular migration of the alloy into both surfaces while the alloy is maintained in liquid form by prolonged furnace heating. Degradation of the metallic surfaces which would normally result from such prolonged heating due to the excessive migration of the brazing alloy into the base metal is prevented by a compatible metallic membrane applied to one or both sides of the stated intervening layer.

1 Claim, 4 Drawing Figures

PATENTED DEC 18 1973  3,779,721

INVENTOR.
VIRGIL L. HERMAN
BY
-ATTORNEY-

3,779,721

COMPOSITE METAL HAVING BONDED MEMBERS OF BERYLLIUM

BACKGROUND OF THE INVENTION

The field of this invention relates to the joining of similar or non-similar metallic materials and more specifically to a method of forming a joint and a joint employing in combination the technique of brazing and intermolecular bonding.

Brazing is the joining of similar or dissimilar metals with the filler metal or alloy being of a lower melting point than that of the metals joined. The brazing alloy must be compatible with the materials to be joined. It is well known that in the brazing process the metals to be joined by the brazing alloy must be free from oxides upon obtaining the brazing temperature. Therefore, to accomplish the freedom from oxides the brazing is usually completed to the exclusion of oxygen during the applying of heat energy to the metals to be joined. One of the most significant advantages of brazing is its ability to join together various designs of structural elements which would be inaccessible by other joining techniques such as welding.

Diffusion bonding is characterized by an intermolecular exchange between contacting metallic surface at suitable pressures and at temperatures below the melting point of the surface materials. Basically, the technique of diffusion bonding relates to the application of a substantial pressure along with the applying of a certain amount of heat energy, which in essence causes the elements of the metallic materials to be physically joined together in a single unit. It is known that there is a relationship between the temperature and pressure in the diffusion bonding process. For example, as the temperature increases, the amount of pressure that is needed decreases. In actual practice, it has been found that when a temperature very close to the melting point of the materials to be joined is employed, a very slight amount of pressure is needed to effect the diffusion bonding technique.

In present brazing methods, the brazing alloy forms a permanent joint by becoming liquid and physically penetrating the intergranular planes of the materials surfaces, and thereafter solidifying upon cooling, thereby holding the two surfaces together. The strength of the joint thus formed is dependent upon the strength of the brazed alloy which is normally lower than the base metallic materials to be joined. If the brazed alloy is modified by the addition of various metallurgical constituents to increase its strength, such additions usually result in increased aggressiveness of the braze alloy. Aggressiveness refers to the propensity of the alloy to migrate deeply into the base material. Extensive migration of the braze alloy produces a weakened joint due to the fact that a smaller amount of the braze alloy remains between the two joined surfaces. Also, extensive migration results in severe grain boundary degradation of the joined materials. Grain boundary degradation is exhibited by a brittle zone directly adjacent to the braze alloy in the joined materials. Grain boundary degradation is probably the most common disadvantage of brazing. Such degradaton is usually caused by the extended period of time required to raise the temperature of the joined materials to effect complete brazing. Grain boundary degration becomes more acute when applied to large workpieces which are to be joined together. The assembled components to be joined must be heated at an elevated temperature for a sufficient period of time to heat the entire mass in order to insure that the braze alloy will become completely liquefied. However, prolonged exposure to elevated temperatures such as required to heat the entire workpiece mass and intervening braze alloy, results in excessive migration of the braze alloy into the parent material. As a result, particularly severe degradation of physical properties both in the parent material and the joint result.

The technique of diffusion bonding usually results in an extremely strong joint usually equal to the parent material strengths. However, the disadvantages of diffusion bonding are many such as the need for high pressures and lengthy period of times at temperature to accomplish bonding. The materials to be bonded may not be compatible and will not allow the intermolecular association between the two elements to be bonded. The diffusion bonding process also requires a high vacuum environment. This need for a high vacuum and also the hith pressure demand the use of high cost facilities and tooling. One of the most important disadvantages in diffusion bonding is that the process is frequently limited for use in joining elements of a certain structural configuration. Diffusion bonding in itself usually requires a forming of a die within which the parts to be joined are placed and assembled and then pressure applied thereto. Clearly, unless a great number of elements are going to be joined together, it would not prove to be economical to design and form a die.

SUMMARY OF THE INVENTION

The inventive concept disclosed herein consists in the discovery that molecular diffusion bonding as associated with solid state joiner of metals may be achieved while one of such metals is in a liquid state such as normally associated with the bond between brazing alloys and the base metals between such alloys are typically used. As the braze alloy will be liquid for a substantial period of time, which is required to bring the entire mass to be joined up to temperature, a protective membrane is to be applied between the braze alloy and the surfaces of the materials to be joined which retards the migration of the braze alloy into the parent material. The thickness and composition of the stated membrane determine the amount and rate of migration of the braze alloy into the parent materials. The membrane is to be also employed as an alloy agent to increase the strength of both the parent material and the brazement. Thus, the membrane is diffused into the parent material and combines with the braze alloys to produce a different, final metallurgical composition in the brazement than that characterizing the braze alloy along. By a careful selecting of the composition of the braze alloy in view of the composition of the parent materials, a brazed joint can be achieved which is of a strength substantially greater than the braze alloy alone and more nearly having the strength characteristics of the parent material.

An additional aspect of the membrane employed within this invention is that the membrane permits and enhances the flow characteristics of the braze alloy on certain parent materials which are normally incompatible with the braze alloy. As, for example, heretofore it has not been possible to braze beryllium to beryllium. However, it has been known that beryllium was compatible with nickel and by the employing of the membrane of nickel, a satisfactory brazed joint was produced with the beryllium.

One of the objects of this invention not readily apparent from the foregoing is that the brazed joint and method of this invention, permits its use in such critical applications as high speed magneto-electric armatures for turbine driven generators and the like. Normally, the forming of such armatures was limited to the method of diffusion bonding itself.

The main object of the method and joint of this invention is to form a brazed joint between metallic materials, the joint having similar strength characteristics of the parent materials.

Another object of this invention incorporates the advantages of a conventional braze operation with the advantages of the strength derived from the diffusion bonding process. In essence, the method and joint of this invention eliminates the disadvantages that is normally associated with the brazing process and the solid state diffusion bonding process, but at the same time combining the most desirable features of both processes.

Another object of this invention is that by the controlling of the braze alloy diffusion rates into the parent material, in substantially large mass assemblies which require long heating cycles to effect brazing, excessive braze alloy diffusion within the parent material is substantially eliminated.

Another object of the method and joint of this invention is that through the use of the protective membrane which can consist of an alloy and through the diffusion of the alloy into the parent material, the bonded joint will have a higher strength characteristic than the parent material alone.

Another object of the method and joint of this invention is through the use of the protective membrane a brazing can be effected between a braze alloy and a noncompatible parent material.

DETAILED DESCRIPTION OF THE INVENTION

Although the brazing process disclosed herein is of wide applicability in forming a variety of diverse joints or connections between elements of different forms and materials, it will be described, for the sake of illustration, in connection with fabrication of a brushless generator rotor or motor armature. The structure of such an armature is well known and is formed as a solid unitary mass made by joining two blocks of magnetic steel to an intervening layer of non-magnetic metal. It is to be understood that the scope of the inventive concept is not to be limited by the specific details relating to the armature which are used to illustrate or explain the inventive concept. Solid unitary rotors of the foregoing type are discussed in U. S. Pat. No. 3,462,628, issued Aug. 19, 1969, and particularly the tremendous strength required between the principal components of the rotor during continuous high operational speed in excess of 10,000 rpm. Brazed joints have not heretofore been used in such highly stressed applications due to lack of necessary strength in such joints. However, rotors fabricated in accordance with the inventive concept disclosed herein have been successfully rotated at speeds from 25,000 to 28,000 rpm without any sign of failure or overstress in the brazed joints between rotor components. In the fabrication method disclosed by mentioned U. S. Pat. No. 3,462,628, a solid unitary billet is initially formed within a retort and is characterized by substantial bulk, most of which is required to be cut away to obtain an armature much smaller than the starting billet. In contrast with the foregoing mentioned patented process, the novel joining method disclosed in this application involves relatively little machining and consequently almost no waste of materials in achieving the final armature configuration.

Figure 4:
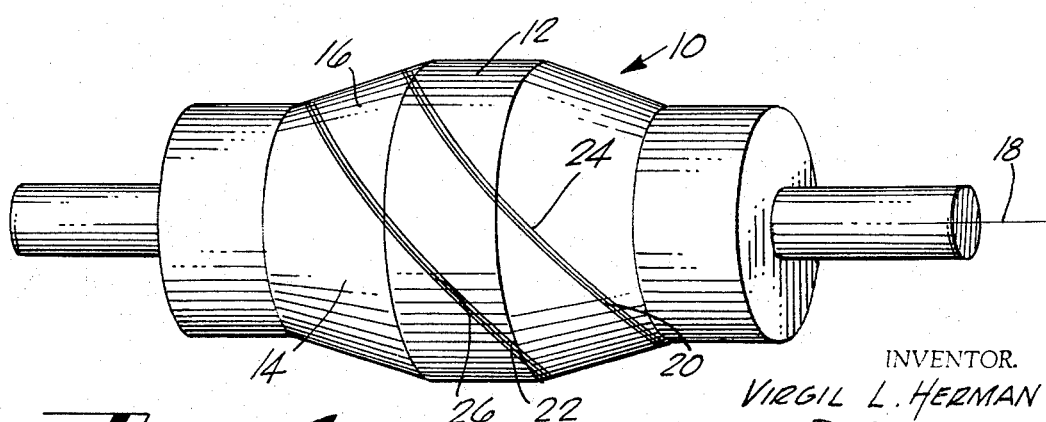
FIG. 4 is a longitudinal view of the armature of FIG. 2 in the final fabricated configuration.

Referring particularly to FIG. 4 of the drawing, there is shown the illustrative case of a magneto-electric armature 10 wherein the joining steps and resulting joint disclosed herein have particularly critical need and application. The finished armature or rotor 10 is generally barrel shaped with magnetic pole pieces 12 and 14 having oppositely corresponding shape and adapted for rotation about a center rotation axis 18 through the rotor mass. Pole pieces 12 and 14 are separated by and joined to an intervening mass of substantially non-magnetic material 16. Mass 16 has substantially parallel and planar spaced apart surfaces 20 and 22, each of which are joined to pole pieces 12 and 14, respectively, according to the novel fabrication process disclosed herein. Pole piece 12 includes a planar surface 24 to correspond to surface 20 and pole piece 14 includes a planar surface 26 to correspond to surface 22.

Figure 1:
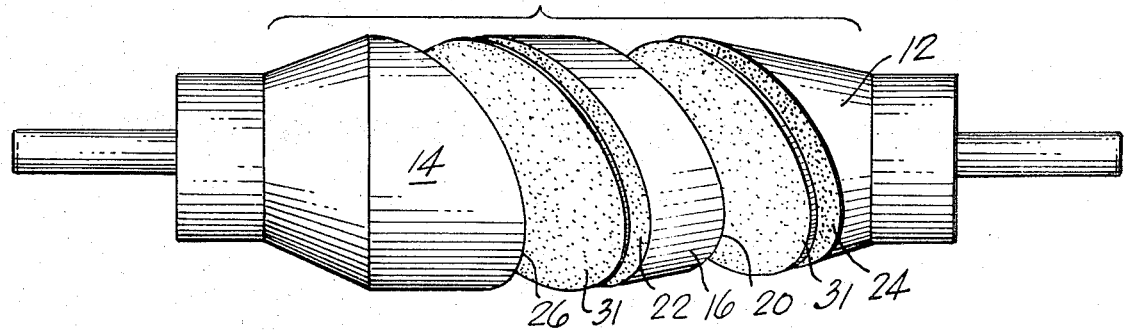
FIG. 1 is a perspective view of a three component armature for an electric motor or generator, the components are to be joined together in accordance with the method of this invention producing the joint of this invention.

As seen from FIG. 1, the novel fabrication process of the invention begins with separate masses or workpiece components which may be forgings or castings and corresponding with elements 12, 14 and 16 discussed above. Elements 12, 14 and 16 each have the same general shape desired for each corresponding element in the finished rotor 10 but are slightly oversized in the condition shown in FIG. 1 in order to permit final trimming operations as required for precise dimensional accuracy in the final article shown in FIG. 4.

The forgings shown in FIG. 1 may comprise a number of different metals or alloys among those which possess the necessary properties with particular regard to strength and magnetic permeability. Thus, elements 12 and 14, as mentioned above, are magnetic steels which are generally characterized by high iron content, low impurity content, and relatively low carbon. The foregoing properties necessarily involve a compromise, since certain of the metallic constituents typically alloyed with steel in order to increase the strength or annealing properties thereof inhibit or otherwise adversely affect the magnetic characteristics of the resulting alloy. For example, the addition of nickel is known to improve the strength of most steel alloys, but high nickel content steels are notoriously lacking in magnetic permeability. Illustratively, pole pieces 12 and 14 may comprise such commercial grade materials as SAE 4130 or 4340 alloy steels, both of which have the requisite strength and magnetic permeability. Center mass 16 may illustratively comprise a steel alloy with a high nickel content such as is known to the trade as Rene 41 or the alloy known as Inconel 718. The composition of the mentioned two non-magnetic materials according to approximate percentage of each constituent element is as follows:

|  | Rene 41 | Inconel 718 |
|---|---|---|
| Carbon | 0.09 | 0.05 |
| Chromium | 19.0 | 18.0 |
| Nickel | 53.0 | 53.0 |
| Molybdenum | 9.75 | 3.0 |
| Cobalt | 11.0 | 0 |
| Columbium | 0 | 5.0 |
| Titanium | 3.10 | 1.0 |
| Aluminum | 1.50 | 0.50 |
| Iron | Balance | Balance |

Both of the foregoing materials are substantially non-magnetic in the sense that no response is exhibited by either when exposed to a magnetic flux field. Moreover, both possess the necessary strength for use in highly stressed parts such as rotor 10. However, brazing of both stated materials is particularly difficult and heretofore considered impractical in high-stress applications because most brazing alloys of familiar type and widespread commercial use degrade the physical properties of these parent materials by migrating deeply therein through grain boundaries. In essence the migration changes the alloy composition of the portion of the parent materials adjacent the joint with the resulting composition having inferior strength characteristics as compared with the parent materials.

However, it was also observed by applicant that a certain amount of migration of the braze alloy into the parent materials could result to increase the strength of the parent material and also the brazement itself. For the braze joint to effect an increase in strength, a particular composition of the brazed alloy must be carefully selected in view of the composition of the parent materials and some means to control diffusion of the brazed alloy into the parent material thereby preventing excessive migration of the braze alloy into the parent material.

As previously stated, the larger the mass that is to be brazed, the longer period of time it takes to bring the entire mass up to the required temperature to effect complete melting of the brazed alloy. It was applicant's belief that as little could be accomplished toward increasing the conduction of the heat energy within the mass, some means must be provided to retard the flow of the portion of the brazed alloy which first becomes liquid. Applicant noted that controlled diffusion of the braze alloy within the parent materials, preventing excessive migration of the brazed alloy, could be accomplished by the applying of the metallic membrane upon the surfaces of the parent materials which are to be jointed. Although applicant found that the use of a nickel composition for the membrane to be most satisfactory when joining together magnetic metallic materials to non-magnetic metallic materials, it is to be considered within the scope of this invention to employ other compositions of membranes in the joining of the same or similar parent materials and/or different parent materials.

For purposes of illustration, three specific examples of membranes will not be considered:

JOINING OF RENE 41 to 4130 STEEL

Figure 3:
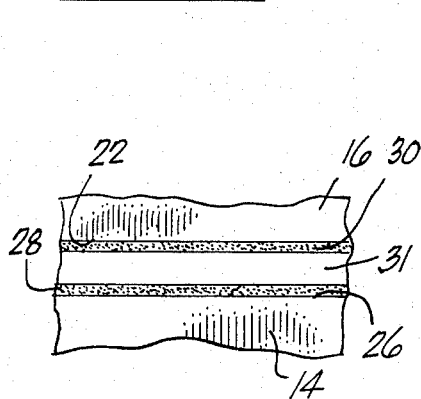
FIG. 3 is an enlarged cross sectional view of one of the armature joints of FIG. 2 prior to effecting the joining procedure.
Figure 2:
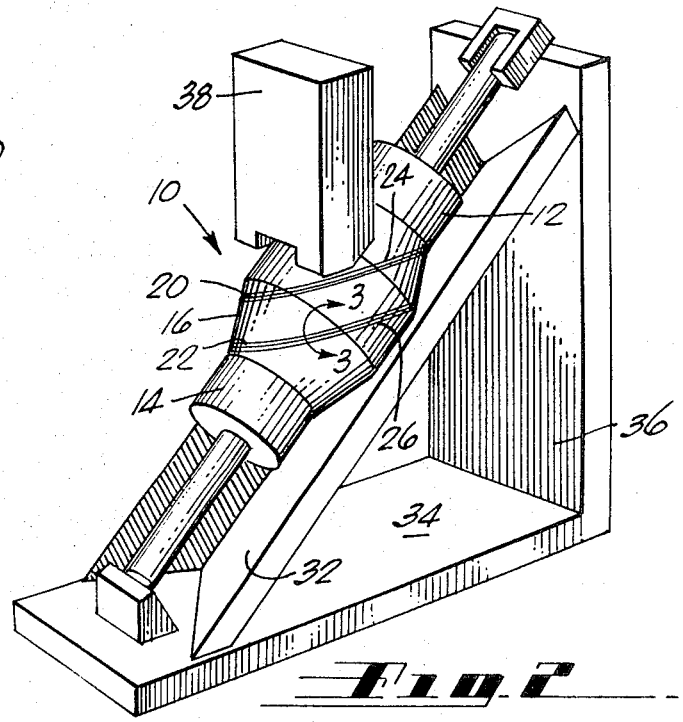
FIG. 2 is an exploded perspective view showing the workpiece components of FIG. 1 assembled in the desired final relationship and located within an apparatus to retain the components in place during the joining procedure.

In the drawing it will be presumed for illustrative purposes regarding this example that components 12 and 14 are of the magnetic composition 4130 steel with the center component 16 being of the composition of the non-magnetic Rene 41. For an enlarged view of the joint formed, reference may be had in particular to FIG. 3 of the drawing. Upon each of the surfaces 20, 22, 24 and 26 a layer of pure nickel 0.002 inches thick is electro-deposited thereon. In referring to FIG. 3, this nickel membrane is shown as 28 and 30 being applied to surfaces 26 and 22, respectively. A commercially available braze alloy 31 consisting of 50 percent gold, 25 percent nickel and 25 percent platinum of a thickness approximately 0.004 inches is to be placed between each of the nickel plated surfaces which are to be joined. The entire mass is then heated to 2,150° Fahrenheit for a period of 5 hours in a hydrogen atmosphere while being subjected to a pressure of 2 psi. To effect the environmental conditions, the unjoined components 12, 14 and 16 are assembled in the unjoined state upon a guide block 32. Guide block 32 is substantially V-shaped to be able to retain therein armature 10. Guide block 32 is securely attached to a base 34 by a stanchion 36. It is to be noted that the resting position of armature 10 is such that the center line 18 is located at approximately a 60° angle with respect to horizontal. This substantially upright position of armature 10 is necessary so that the plane of the joints to be formed are substantially horizontal. Thereby, upon the brazed alloy becoming liquid, it will tend to maintain even distribution throughout the joint.

A weight block 38 is to be placed upon component 12 to apply the desired two psi pressure to effect the joining. Once the armature 10 is in the position within guide block 32, appropriate retaining means is employed to maintain the position of the components 12, 14 and 16 during the joining procedure, such retaining means not being shown. The entire structure is then placed within a retort and surrounded by a non-oxygen environment such as hydrogen. Due to the inclusion of the nickel membrane upon each of the surfaces, the resulting strength of the joint has been found to be approximately 25 percent greater than a non-controlled joint.

JOINING OF BERYLLIUM TO BERYLLIUM

Heretofore, it has not been possible to effect a brazed joint of beryllium to berryllium due to the severe grain boundary attack in the beryllium surface. To effect the brazing of beryllium of the method of this invention, a commercially available braze alloy consisting of sixty percent silver, thirty percent copper and ten percent tin is employed. The surface of the beryllium is to be first electroplated with a flash layer of silver, and then a controlled layer of nickel applied upon the silver, thus forming the membrane. The braze alloy was placed in between the surfaces to be joined with the brazement being effected at 1,490° Fahrenheit for a period of time to be determined by the size of the mass of the materials. The result is controlled diffusion brazing restricting the braze alloy diffusion into the beryllium to 0.003 of an inch deep, thus producing a joint strength equal to the parent materials.

JOINING OF IRON FOIL TO BERYLLIUM

The structure of iron foil and beryllium is frequently used in computer memory drums. The same procedure was used as in the second example, that is, the surface of the beryllium was coated with a membrane comprising a flash layer of silver and then a controlled layer of nickel. Such a membrane controls the diffusion of the braze alloy into the beryllium. By the coating on the beryllium side of the interface, the brittle intermetallic diffusion zone has been illiminated, resulting in a high strength bond.

It is believed to be apparent that the method and joint of this invention has been adequately described in the foregoing. It is to be understood that although the method and joint of this invention has been found to be especially applicable to magneto-electro armatures, the method and joint of this invention may be applied to any brazement of any metallic materials of any mass size wherein excessive migration of the braze alloy is a problem resulting in a weakening of the joint.

What is claimed is:

1. A brazed joint effecting an integral connection between a first metallic member and a second metallic member, said first and second metallic members being composed of beryllium, said first member having a first joining surface and said second member having a second joining surface, said joint comprising:

a first metallic membrane applied to said first joining surface;

a second metallic membrane applied to said second joining surface, each of said first and second membranes being composed of a flash layer of silver and a controlled layer of substantially pure nickel, said first and second metallic membranes being applied to their respective first and second joining surfaces by electroplating;

said first and second members being located so said first and second metallic membranes are in an adjacent relationship; and a brazing alloy located between said first and second metallic membranes and joining said first and second metallic members, said joint being formed by heating said brazing alloy to the liquid state and effecting an intermolecular migration of said brazing alloy into said first and second metallic members, said brazing alloy being of the composition of 60 percent silver and 30 percent copper and 10 percent tin;

each of said first and second joining surfaces being substantially planar, upon said brazing alloy becoming liquid said planar first and second joining surfaces being substantially horizontal, whereby substantially even flow distribution of said brazing alloy is achieved, said first and second membranes functioning to retard the migration of said brazing alloy into said first and second metallic members.

* * * * *